United States Patent Office 2,707,710
Patented May 3, 1955

2,707,710

PREPARATION OF VITAMIN $D_3$

Léon Velluz, Paris, and Gaston Amiard, Romainville, France, assignors to UCLAF, a corporation of France No Drawing. Application January 26, 1950,
Serial No. 140,752

Claims priority, application France February 4, 1949

7 Claims. (Cl. 260—397.2)

This invention relates to vitamin preparations and methods of making the same; more particularly, the invention relates to a new substance useful in clinical and veterinary therapeutics as well as for the preparation of vitamin $D_3$.

In our copending application Serial No. 124,504, filed October 29, 1949, now Patent No. 2,693,475, we have disclosed a new chemical substance useful for the preparation of vitamin $D_2$ and a process of making the same, as well as a process for producing vitamin $D_2$ from said new substance which we call precalciferol. Additional research has enabled us to achieve analogous results in connection with vitamin $D_3$.

It is, therefore, an object of the present invention to provide a novel chemical substance, hereinafter referred to as "previtamin $D_3$".

It is also an object of this invention to provide methods for the preparation of previtamin $D_3$.

It is a further object of the invention to provide a process for preparing vitamin $D_3$ from the previtamin disclosed in the present application.

One procedure for obtaining this new substance is to prepare in the usual manner the irradiation "resin" of 7-dehydrocholesterol, then to esterify it, for example with dinitro-3, 5-benzoyl chloride, while carefully keeping the temperature below 25° C. at all stages of the process. This step may be followed by chromatographic separation on neutral alumina. From the fraction least strongly adsorbed, an amber colored oil is separated which gradually crystallizes under ligroin. Previtamin $D_3$ in the form of its dinitrobenzoate is thus isolated, with a yield of the order of 50% of the "resin."

Percentage analysis and cryoscopy show that this dinitrobenzoate of previtamin $D_3$, $C_{34}H_{46}O_6N_2$, is an isomer of the dinitrobenzoate of vitamin $D_3$.

| Analysis | C% | H% | N% | Molec. Weight |
|---|---|---|---|---|
| Computed | 70.55 | 8.0 | 4.8 | 579 |
| Found experimentally | 70.5 | 7.85 | 4.9 | 555 |

The new substance is clearly distinguishable from the dinitrobenzoate of vitamin $D_3$, just as it can not possibly be confused with any of the derivatives previously described in the formation of this vitamin. The table below gives the physical constants published in literature and those determined by the applicants to permit a comparison with those of dinitrobenzoate of previtamin $D_3$.

| | Melting Point | $(\alpha)_D$ Specific Rotary Power |
|---|---|---|
| 7-Dehydrocholesterol (dinitrobenzoate) | 207° C | −46° ($CHCl_3$) |
| Lumisterol 3 (dinitrobenzoate) | 131° C | +20° ($CHCl_3$) |
| Tachysterol 3 (amorphous) | | −11° ($CHCl_3$) |
| Previtamin $D_3$ (dinitrobenzoate) | 110–111° C | {+52° ($CHCl_3$) / +38° ($C_6H_6$)} |
| Vitamin $D_3$ (dinitrobenzoate) | 142° and 150° C (dimorphic) | {+97° ($CHCl_3$) / +62° ($C_6H_6$)} |

Dinitrobenzoate of previtamin $D_3$ crystallizes in fine, very pale yellow needles. The best solvent so far discovered for separating it is methylethylketone.

Alkaline saponification of the dinitrobenzoate at 10–15° C. produces previtamin $D_3$ in an amorphous state. The specific rotary power of this substance for the D line of the spectrum is in the vicinity of +40° (benzene c=1%), while it is +83° for the vitamin $D_3$.

When subjected to the action of acid chlorides or of acid anhydrides, previtamin $D_3$ produces esters, the most interesting of which seems to be the dinitrobenzoate already described. Previtamin $D_3$ is not precipitated by digitonin.

This new substance, obtained by saponification of its dinitrobenzoate, exhibits an evolution of its rotary power when heated in a solvent. It thus forms vitamin $D_3$ without being subjected to light energy.

As with the precalciferol of the copending application, we have ascertained that previtamin $D_3$ can be obtained by another process based on the following observation: The transformation of the previtamin $D_3$ exhibits a reversible character.

Consequently, if a solution of dinitrobenzoate of vitamin $D_3$ is heated moderately, say at 60° C. for 20 hours, the rotary power for the D line of the spectrum changes in the direction of a slight diminution from +62° to +58°. Fractional crystallizations and chromatography yield dinitrobenzoate of previtamin $D_3$ which, by saponification, in turn yields previtamin $D_3$.

However, since in this instance the equilibrium of the two substances is always strongly displaced in favor of the vitamin, the yield of previtamin is evidently very inferior to that of the direct process.

Various modes of preparation of previtamin $D_3$ are given below by way of example but without limiting the scope of this invention as defined in the appended claims:

*Example 1.—Direct process (preparation of previtamin $D_3$ beginning with the irradiation "resin" of 7-dehydrocholesterol)*

50 grams of 7-dehydrocholesterol dissolved in 5000 cc. of sulfuric ether are irradiated for one hour in a nitrogen atmosphere at a temperature of 16° C. by the light of magnesium sparks. After distillation of the ether under vacuum at below 10–15° C., the non-transformed 7-dehydrocholesterol (32 grams) is eliminated by treatment with methanol, in which it is only slightly soluble. After evaporation of the methanol under vacuum at 30° C., the residual oil is purified of the last traces of methanol by several treatments with benzene. The "resin" thus obtained (17 grams) is esterified in one hour at 15° C. in a benzene solution with chloride of dinitro-3,5-benzoyl in the presence of pyridine. After washing of the benzene solution with a 10% solution of sodium bicarbonate, then with water, and finally with dilute hydrochloric acid, the benzene is removed under a reduced pressure at 10–15° C. The crude, oily dinitrobenzoate is treated several times in petroleum ether in order to eliminate the last traces of benzene, whereupon it is dissolved in 1200 cc. of petroleum ether. After a night under refrigeration, a slight quantity of indissoluble substance is separated by filtration, and then the solution is chromatographed on a column of 375 grams of neutral alumina. The chromatrogram is developed by washing with petroleum ether until the yellow coloration reaches the bottom of the column. The washings with petroleum ether are continued and the filtrate is collected until the second yellow ring, a little darker, reaches the bottom of the column. The filtrate is concentrated to small volume by distillation under reduced pressure at 10–15° C. 7.1 grams of dinitrobenzoate of previtamin $D_3$ are separated in fine, white-yellowish needles having a melting point of 110–111° C. (block), specific rotary power of $(\alpha) = +38°$ (benzene c=1%). The filtrate is concentrated and one volume of absolute alcohol is added to it three times. Another 2.25 grams of less pure dinitrobenzoate of previtamin $D_3$ are separated, melting point 106–107° C. (block). The yield, therefore, surpasses 50% by weight of the purified and non-esterified "resin" of 7-dehydrocholesterol.

The previtamin is obtained by alkaline saponification of its dinitrobenzoate, employing the usual methods, but keeping the temperature always below 15° C.

*Example 2.—Indirect process (obtaining previtamin $D_3$ from the dinitrobenzoate of vitamin $D_3$)*

2.9 grams of dinitrobenzoate of vitamin $D_3$ are dissolved in 30 cc. of benzene and heated in darkness for 15 hours at 60° C. The benzene is removed completely under reduced pressure at a temperature of less than 20° C. The residue is treated with 30 cc. of petroleum ether at 20° C. and the insoluble part filtered off. In this manner 1.55 grams of dinitrobenzoate of vitamin $D_3$, melting point 149° C. (block) are collected. If the filtrate is concentrated to 20 cc., a second quantity of 0.35 gram of dinitrobenzoate of vitamin $D_3$, same melting point, is obtained.

This last filtrate is then chromatographed on 20 grams of neutral alumina. By washing with petroleum ether as described in Example 1, 0.3 gram of dinitrobenzoate of previtamin $D_3$, M. P. 110° C. (block) is collected. Washing the alumina in ether permits extraction of 0.5 gram of dinitrobenzoate of vitamin $D_3$.

In all, there has been separated: 0.3 gram of dinitrobenzoate of previtamin $D_3$, M. P. 100° C. (block), $(\alpha)_D^{20} = +38.5°$ (benzene c=1%), or about 10% by weight of the initial dinitrobenzoate of vitamin $D_3$, and recuperated were 2.4 grams of dinitrobenzoate of vitamin $D_3$, M. P. 149° C. (block), $(\alpha)_D = +62°$ (benzene c=1%), or about 83% of the total quantity.

*Example 3.—Preparation of vitamin $D_3$ from previtamin $D_3$ without the supply of light energy and employing only the influence of moderate heating*

A 1% solution of dinitrobenzoate of previtamin $D_3$ in benzene is heated while sheltered from light, for example, at 60° C. for 20 hours; for 2 days at 40° C.; or from 2 to 3 hours at 80° C. The higher the temperature, the shorter the duration of the desired transformation. In practice it seems preferable not to exceed 80° C. in order to avoid excessive resinification.

At the start of the process, the specific rotary power is that of dinitrobenzoate of previtamin $D_3$ in benzene, say $+38.5°$. Gradually, this rotary power increases and at the end of the process attains a value very close to that of pure dinitrobenzoate of vitamin $D_3$, in general $+58°$. It suffices to distil the benzene under reduced pressure, then to recrystallize in the usual manner to separate the pure dinitrobenzoate of vitamin $D_3$, M. P. 149–150° C. (block), $(\alpha)_D = +62°$ (benzene), with a yield of 70 to 80%. By saponification of its dinitrobenzoate in the usual manner vitamin $D_3$ is finally obtained.

In the above process, the starting material was the dinitrobenzoate of previtamin $D_3$. The preparation may equally well be made by simple heating of free previtamin, obtained by saponification of its dinitrobenzoate. The rotary power of previtamin $D_3$ in benzene solution is less than that of vitamin $D_3$, $+40°$ instead of $+83°$. In carrying out the heating process just described, the evolution of the rotary power leads, at the end of the process, to a value of the order of $+70°$. The usual concentrations and recrystallizations then permit the separation of the vitamin $D_3$. Alternatively, one may proceed to the direct esterification of the heated product, by the chloride of dinitrobenzoyl and obtain an excellent yield of pure dinitrobenzoate of vitamin $D_3$ from which the vitamin is liberated by saponification.

In both cases, as has been shown, the new substance for producing vitamin $D_3$, which forms the object of the present invention, produced vitamin $D_3$ most satisfactorily under the influence of moderate heating and in the absence of light. However, numerous variations may be employed without departing from the principle or scope of the invention, i. e. the preparation of vitamin $D_3$ from previtamin $D_3$, as set forth in the claims.

What is claimed is:

1. A process for the manufacture of vitamin $D_3$ comprising the steps of subjecting previtamin $D_3$ of the formula $C_{27}H_{44}O$ to moderate heating, not substantially exceeding 80° C., in the presence of a solvent, and separating the vitamin $D_3$ formed thereby, said previtamin $D_3$ starting material being an isomer of vitamin $D_3$, having a rotary power $(\alpha)_D$ of about $+40°$ (benzene c=1%) and forming a 3,5-dinitrobenzoate having a melting point of about 110–111° C.

2. A process for the manufacture of vitamin $D_3$ comprising the steps of subjecting an ester of previtamin $D_3$ of the formula $C_{27}H_{44}O$ to moderate heating, not substantially exceeding 80° C., in the presence of a solvent, said ester of pre-vitamin $D_3$ derived from previtamin $D_3$ having a rotary power $(\alpha)_D$ of about $+40°$ (benzene c=1%) and forming a 3,5-dinitrobenzoate having a melting point of about 110–111° C., transforming the resultant ester of the vitamin into the pure vitamin, and separating the same.

3. Process according to claim 2, wherein said ester is the dinitrobenzoate.

4. A process for the manufacture of previtamin $D_3$ of the formula $C_{27}H_{44}O$ comprising the steps of esterifying the irradiation produce of 7-dehydrocholesterol, separating by chromatography a less strongly adsorbed fraction of the esterified irradiation product, crystallizing said fraction by means of a solvent, recrystallizing the reaction product by means of a solvent, the temperature during said esterification, chromatographic treatment, crystallization, and recrystallization not exceeding about 25° C., and saponifying the recrystallized product with alkalies at a temperature not exceeding 15° C., said recrystallized previtamin $D_3$ having a rotary power $(\alpha)_D$ of about $+40°$ (benzene c=1%) and forming a 3,5-dinitrobenzoate having a melting point of about 110–111° C.

5. A process for the manufacture of previtamin $D_3$ of the formula $C_{27}H_{44}O$ comprising the steps of esterifying the irradiation product of 7-dehydrocholesterol, separating the least adsorbed fraction of esterified product by chromatography, crystallizing the separated fraction by means of ligroin, recrystallizing the product by means of methylethylketone and alcohol, the temperature during said esterification, chromatographic treatment, crystallization and recrystallization not exceeding about 25° C., and saponifying the recrystallized product with alkalies at a temperature below 15° C., said recrystallized previtamin $D_3$ having a rotary power $(\alpha)_D$ of about $+40°$ (benzene c=1%) and forming a 3,5-dinitrobenzoate having a melting point of about 110–111° C.

6. A process for the manufacture of a vitamin preparation comprising the steps of subjecting an ester of vitamin $D_3$ to moderate heating, not substantially exceeding 60° C., in the presence of a solvent, separating the reaction product, and saponifying the same to obtain previtamin $D_3$ of the formula $C_{27}H_{44}O$ having a rotary power $(\alpha)_D$ of about $+40°$ (benzene c=1%) and forming a 3,5-dinitrobenzoate having a melting point of about 110–111° C.

7. A process for the manufacture of previtamin $D_3$ of the formula $C_{27}H_{44}O$ comprising the steps of moderately heating dinitrobenzoate of vitamin $D_3$ in the presence of a solvent, extracting the reaction product by means of solvents and chromatography, crystallizing the extracted product, and saponifying the same to produce previtamin $D_3$ of the formula $C_{27}H_{44}O$ having a rotary power $(\alpha)_D$ of about $+40°$ (benzene c=1) and forming a 3,5-dinitrobenzoate having a melting point of about 110–111° C.

(References on following page)

References Cited in the file of this patent

UNITED STATES PATENTS

| | | |
|---|---|---|
| 2,099,550 | Windaus | Nov. 16, 1937 |
| 2,302,828 | Yoder | Nov. 24, 1942 |

FOREIGN PATENTS

| | | |
|---|---|---|
| 230,808 | Switzerland | Apr. 17, 1944 |

OTHER REFERENCES

Hickman, Ind. Eng. Chem. 30, 796–802 (1938).